Sept. 12, 1939.    O. W. GITHENS ET AL    2,172,348
CAMERA
Filed Dec. 15, 1936    2 Sheets-Sheet 1

INVENTORS
OTTO W. GITHENS
WILLIAM L. LAWSON
BY
ATTORNEY

Sept. 12, 1939.   O. W. GITHENS ET AL   2,172,348
CAMERA
Filed Dec. 15, 1936   2 Sheets-Sheet 2
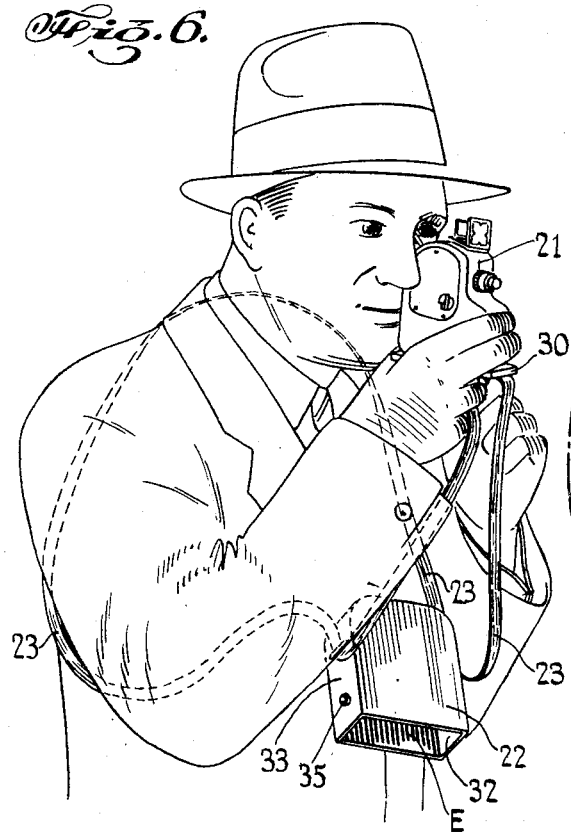
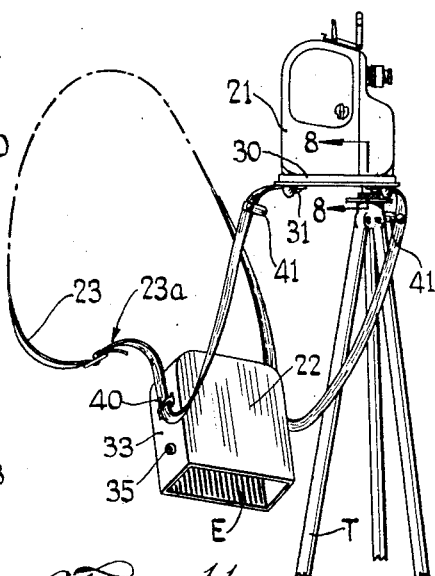
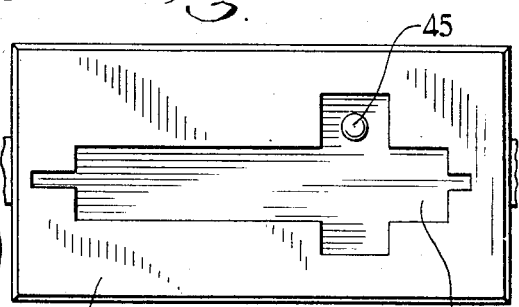
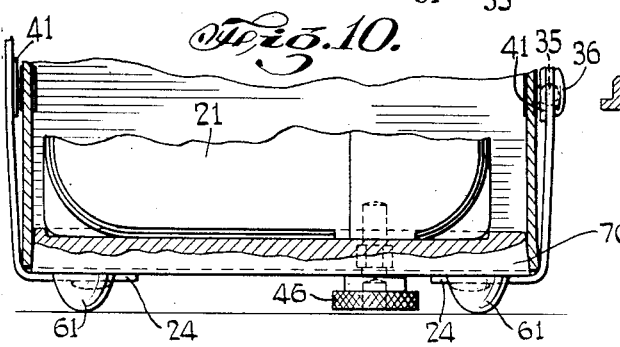
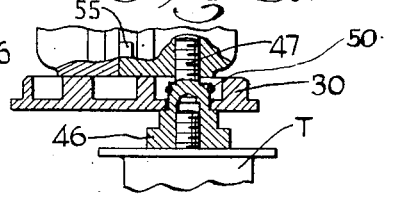
INVENTORS
OTTO W. GITHENS
WILLIAM L. LAWSON
BY
ATTORNEY Patented Sept. 12, 1939

2,172,348

UNITED STATES PATENT OFFICE 2,172,348

CAMERA

Otto W. Githens and William L. Lawson, New York, N. Y., assignors, by mesne assignments, to Universal Camera Corporation, New York, N. Y., a corporation of Delaware Application December 15, 1936, Serial No. 115,909

9 Claims. (Cl. 95—86)

This invention relates to cameras. More particularly, it relates to camera carrying cases.

One of the objects of this invention is to provide a camera carrying case which shall be of such construction that in addition to its function of housing a camera, it will also prevent damage to the camera caused by dropping.

Another object of this invention is to provide a carrying case of the character described adapted to house a camera having highly improved means for connectively attaching said case and said camera to the person of the user, whereby the camera will be held captive at all times while in use or when not in use.

Still another object of this invention is to provide a highly improved camera carrying case of the character described which shall comprise relatively few and simple parts which shall be easy to assemble, which shall be relatively inexpensive to manufacture, which shall be rugged in construction, pleasing in appearance, and at the same time operate with a high degree of efficiency.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible embodiments of this invention, Fig. 1 is a perspective view illustrating a camera case embodying the invention, as worn by an individual, when said camera is not in active use;

Fig. 6 is a view similar to Fig 3 but illustrating the camera and carrying case in actual use for taking photographs;

Fig. 7 is a perspective view of our invention illustrating its use in connection with a tripod;

Fig. 8 is a sectional view taken substantially on the line 8—8 of Fig. 7;

Fig. 9 is a bottom plan view of one form of camera adapted for use in combination with the carrying case of this invention;

Fig. 10 is a cross-sectional view of a portion of the Fig. 2 form of construction, but illustrating a modified form of bottom wall for the carrying case of this invention; and Fig. 11 is a plan view of the modified form of bottom wall illustrated in Fig. 10.

Figure 1:
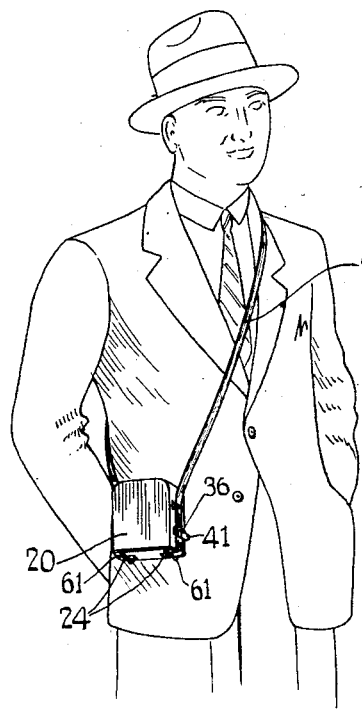
Figure 2:
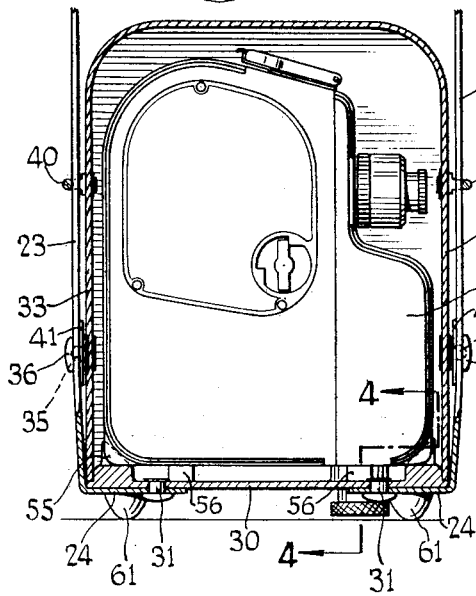
Fig. 2 is a longitudinal cross-sectional view of the camera case illustrated in Fig. 1 disclosing the method of releasably attaching a camera thereto.
Figure 4:
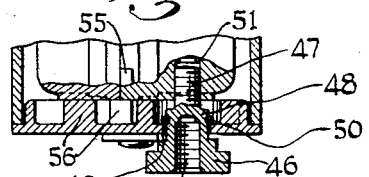
Fig. 4 is a cross-sectional view taken substantially on the line 4—4 of Fig. 2.
Figure 5:
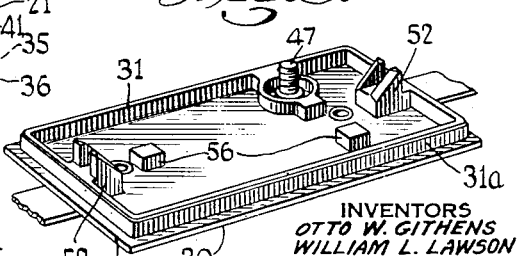
Fig. 5 is a perspective view of the lower wall of the carrying case disclosing the construction thereof.

Referring now in detail to the drawings, there is disclosed a carrying case 20 embodying the features of this invention, and adapted to house a camera 21. The improved carrying case 20 comprises a hollow rectangular casing 22 made of any suitable material adapted to safely carry and protect a camera. The said casing 22 is so constructed as to be open at one end only, preferably the bottom end E, as clearly shown in Figs. 6 and 7 of the drawings. To facilitate the carrying of the casing 20 containing the camera 21, there is provided an elongated flexible member, such as a strap 23, which is made of sufficient length to be looped over the shoulder of the user, as shown in Fig. 1 of the drawings. The strap 23 may be provided with the usual buckle and eyelet 23a (Fig. 7) for the purpose of adjusting the length of the strap. The strap 23, as shown in the drawings, is severed to provide two ends 24 which are permanently fixed to the underside of a closure member 30, by any suitable fastening means, such as rivets 31. However, it is understood that the strap member 23 may be of continuous non-severed construction and may be suitably fastened to the said closure member 30. The member 30 is preferably made of rigid metallic material and is adapted to serve as the closure or bottom wall of the open end E of the casing and to fit snugly therein to form a completely enclosed camera casing. Lateral displacement of the member 30 when positioned at the bottom wall of the casing is prevented by providing an upstanding ridge 31 suitably spaced from the periphery of said member 30 so that the outer wall 31a thereof will frictionally contact the inner surfaces of the opposed vertical side walls 32 and 33 of the casing 22. The outer edges 30a of the member 30 may be designed so as to be flush with the outer surfaces of the walls 32 and 33, to present a neat appearance, as clearly shown in Fig. 2 of the drawings. To retain the member 30 in assembled relationship with the casing 22, there is provided releasable fastening means such as snap fastener parts 35 on each of the walls 32 and 33 which are adapted to cooperate with corresponding snap fastener parts 36 on the strap 23. There is also provided on each of the walls 32 and 33 looped members 40 forming a guideway through which the strap 23 is adapted to freely pass. The function of the members 40 is to maintain those portions of the strap 23 which are adjacent the side walls 32 and 33 substantially centrally disposed with respect to said walls 32 and 33. At the same time the members 40 serve to prevent the undesired separation of the snap fastener members 35 and 36 by relieving the strain of the strap 23 on the snap fasteners, for it is seen that were the guides 40 omitted, the entire strain of the weight of the camera casing 22 and the camera 21 would be applied to the strap 23 directly on the snap fastener members 35, 36. The guides 40 also serve to hold the casing 22 captive when the camera 21 has been withdrawn for use, as will become clearly apparent as the description proceeds. When it is desired to remove the camera from the casing for active use it is merely necessary to separate the snap fastener parts 35 and 36 on each of the side walls 32 and 33, and to pull the bottom wall member 30 downwardly to open the casing and thus release the camera for use. To facilitate the separation of the snap fastener parts 35, 36, there is provided on the strap 23, adjacent said snap fastener parts, flap extensions 41.

Due to the wide-spread use of relatively smaller sized motion picture cameras, as well as other types of camera which contain delicate mechanism, it is necessary, while handling, to exercise more than usual care in order to avoid dropping the camera out of the operator's hand and thereby cause serious damage. As a matter of fact, it has been found that these relatively small sized cameras, do in many instances fall out of the hands of the users while taking pictures or in the act of withdrawing said cameras, from the type of carrying cases heretofore employed.

By this invention there is provided an improved camera carrying case designed to prevent damage to the camera resulting from dropping out of the hands of the operator during the act of withdrawal from the case as well as during active use. At the same time, means are provided whereby the case is at all times held captive whether the camera is in use or not. This prevents loss of or damage to the case.

To this end, the member 30 is provided with a thorough opening 45 adapted to receive therein an annular bushing member 46 provided at its upper end with a screw threaded shaft 47, of reduced diameter, and adapted to project inwardly of the casing 22 when said member 30 is in closed assembled relationship with said casing 22. The bushing 46 is provided with a portion 48 thereof of slightly smaller diameter than the opening 45 so that it may rotate freely therein, and is adapted to project inwardly through said opening 45, such inward movement being limited by a shoulder 49. To limit the vertical displacement of the bushing 46 and at the same time permit axial rotation thereof, the portion 48 is provided with a groove into which there is fitted an annular wire member 50 of greater diameter than the opening 45.

The camera 21 is detachably attached to the member 30 by screwing the shaft 47 into a threaded opening 51 in the bottom wall of the camera, said opening 51, being the threaded opening usually provided in cameras for mounting the same on a tripod. The camera 21 is thus held firmly in position on the member 30 at all times by means of the bushing 46. To further prevent displacement of the camera 21 while connected to the member 30, there is provided forked guideways 52 on the member 30 which are suitably designed to receive therein, projections 55 provided on the bottom wall of the camera. To further aid in the proper balancing and positioning of the camera 21, there may be provided bosses 56 suitably positioned on the member 30 so as to contact definite recessed portions on the bottom wall of the camera.

It is noted that the stop member 50 is so disposed as to allow the top of the screw portion 47 of the bushing 46 to drop down below the level of the top of the guides 52 to permit the proper positioning of the projections 55 on the camera therein before tightening up said screw 47.

It is thus seen from the above described construction that when the camera 21 is properly secured to the closure member 30, and once the strap 23 is looped over the shoulder of the user, as shown in Fig. 1, the camera will at all times thereafter be protected against damage caused by dropping, since it will always be held captive.

Figure 3:
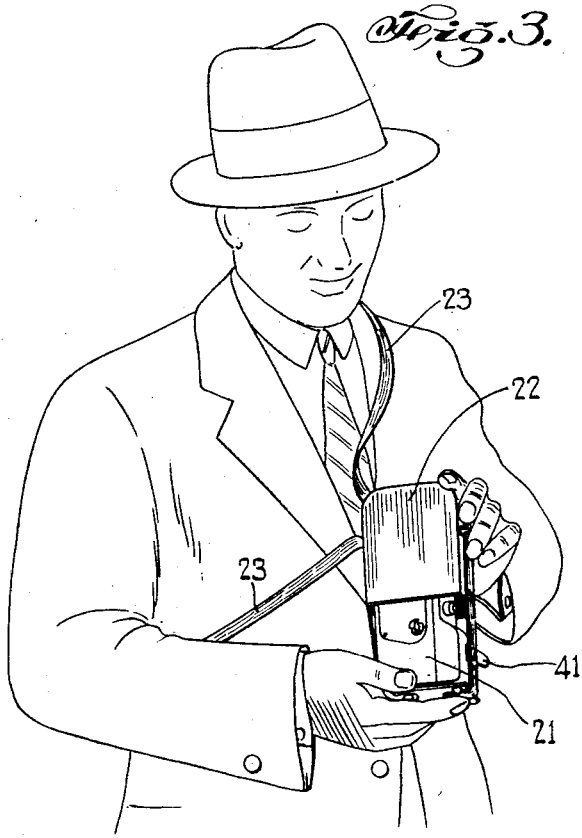
Fig. 3 is a view similar to Fig. 1 but illustrating the method of withdrawing the camera from its case for active use.

In Fig. 3 there is illustrated the method of withdrawing the camera from the casing 22 for active use. In this illustration, the snap fastener parts 35, 36 have already been separated with the air of flaps 41, and the bottom wall member 30 is being disassembled from the casing 22 carrying with it the camera 21 which is firmly attached thereto as above described. It is also noted that the strap 23 is at the same time held in captive position on the person of the user.

In Fig. 6 there is illustrated the camera 21 after it has been withdrawn entirely from the casing 22 and is shown in actual use. It is noted that the bottom wall 30 to which the camera is attached may also be utilized as an aid in holding the camera. If while the user of the camera, as shown in Fig. 6, should for any reason drop the camera out of his hands, it is clearly seen that the said camera will be prevented from falling to the ground by the strap 23 which is permanently fastened to the bottom wall member 30, and is looped over the shoulder of the user.

If it is desired to use the camera 21 in connection with a tripod T, as illustrated in Fig. 7, the bushing 46 is provided with a threaded opening 60 therein which is similar to the openings 51 generally provided in most cameras for the purpose of attaching the same to tripods. Such operative connection is clearly shown in detail in Fig. 8 of the drawings. The camera when used as shown in Fig. 7, may also be protected against damage due to the upsetting of the tripod by looping the strap 23 about the shoulder of the user in a manner similar to that shown in Figs. 1, 3 and 6.

If it is desired to take a picture with a camera 21 resting on a stationary support, the bottom wall member 30 is provided with legs 61 of suitable design which are of sufficient size to clear the heads of the rivets 31 and the lower surface of the bushing 46.

In Figs. 10 and 11 there is shown a modified form of closure member 70 which is provided with tapered edges instead of the upstanding ridge 31 of the member 30. The wall member 70 is adapted to be wedged into position on the casing 22, as clearly shown in Fig. 10. The inner surface of the member 70 may be provided with suitably recessed portions R corresponding to the projecting portions on the bottom wall of the camera to prevent lateral displacement. The camera 21 may be firmly attached to the member 70 by means of the bushing 46.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described our invention, we claim as new and desire to secure by Letters Patent:

1. A camera carrying case of the character described comprising side walls, end walls, and a top wall, a removable bottom wall adapted to serve as a closure for said case, means for attaching a camera to said removable bottom wall, and means for attaching said case to the person of the user, said last named means comprising a strap attached to said bottom wall, and snap fastener means for releasably retaining said bottom wall in assembled relationship with said case.

2. A camera carrying case of the character described comprising side walls, end walls, and a top wall, a removable bottom wall adapted to serve as a closure for said case, means for attaching a camera to said removable bottom wall, means for attaching said case to the person of the user, said last named means comprising a flexible member attached to said bottom wall, releasable means for retaining said bottom wall in assembled relationship with said case, and means to facilitate the separation of said releasable retaining means.

3. A camera case of the character described comprising integral side walls, end walls and a top wall, a separate bottom wall adapted to serve as a closure for said case, means for detachably attaching a camera to said removable bottom wall, and means for attaching said case to the user thereof, said means comprising an elongated flexible member permanently attached to said bottom walls.

4. A camera carrying case of the character described comprising a hollow casing open at one end, a closure member for said open end, means for removably attaching said closure member to said casing, means for detachably attaching a camera to said closure member, an elongated flexible member attached to said closure whereby to form a loop adapted to encircle a portion of the body of said user, and means for holding said casing captive on said flexible member upon removal of said closure member from said casing.

5. A camera carrying case of the character described comprising a hollow casing open at one end, a closure member for said open end, means for removably attaching said closure member to said casing, means for detachably attaching a camera to said closure member, an elongated flexible member attached to said closure whereby to form a loop adapted to encircle a portion of the body of said user, and means for holding said casing captive on said flexible member upon removal of said closure member from said casing, said last named means comprising loops on said casing.

6. A camera carrying case of the character described comprising a hollow casing open at one end, a closure member for said open end, means for removably attaching said closure member to said casing, means for detachably attaching a camera to said closure member, an elongated flexible member attached to said closure whereby to form a loop adapted to encircle a portion of the body of said user, and means for holding said casing captive on said flexible member upon removal of said closure member from said casing, said last named means comprising loops on said casing through which said flexible member is adapted to pass.

7. A camera carrying case of the character described comprising a hollow casing open at one end, a closure member for said open end, means for removably attaching said closure member to said casing, means for detachably attaching a camera to said closure member, said last named means comprising a member rotatably mounted in said closure member, and an elongated flexible member attached to said closure whereby to form a loop adapted to encircle a portion of the body of said user.

8. A camera carrying case of the character described comprising a hollow casing open at one end, a closure member for said open end, means for removably attaching said closure member to said casing, means for detachably attaching a camera to said closure member, said last named means comprising a threaded shaft on said closure member adapted to be received in a correspondingly threaded aperture in said camera, and an elongated flexible member attached to said closure whereby to form a loop adapted to encircle a portion of the body of said user.

9. A camera carrying case of the character described comprising a hollow casing open at one end, a closure member for said open end, means for removably attaching said closure member to said casing, means for detachably attaching a camera to said closure member, said last named means comprising a threaded shaft on said closure member adapted to be received in a correspondingly threaded aperture in said camera, said shaft being free to rotate axially and having limited longitudinal axial movement with respect to said closure member, and an elongated flexible member attached to said closure whereby to form a loop adapted to encircle a portion of the body of said user.

OTTO W. GITHENS.
WILLIAM L. LAWSON.